US009737984B2

(12) United States Patent
Yamamoto et al.

(10) Patent No.: US 9,737,984 B2
(45) Date of Patent: Aug. 22, 2017

(54) POWER TOOL

(71) Applicant: MAKITA CORPORATION, Anjo-shi, Aichi (JP)

(72) Inventors: Hirokatsu Yamamoto, Anjo (JP); Takaaki Osada, Anjo (JP); Manabu Sugimoto, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 474 days.

(21) Appl. No.: 14/534,418

(22) Filed: Nov. 6, 2014

(65) Prior Publication Data
US 2015/0122523 A1 May 7, 2015

(30) Foreign Application Priority Data
Nov. 7, 2013 (JP) ................. 2013-231610

(51) Int. Cl.
*B25B 23/147* (2006.01)
*B25F 5/00* (2006.01)
(Continued)

(52) U.S. Cl.
CPC ............ *B25F 5/001* (2013.01); *B23B 45/008* (2013.01); *B25B 21/008* (2013.01);
(Continued)

(58) Field of Classification Search
CPC ... B25B 21/00; B25B 21/008; B25B 23/0064; B25B 23/14; B25B 23/141; B25B 23/147; B23B 45/008; B23B 45/02; B25F 5/001
(Continued)

(56) References Cited

U.S. PATENT DOCUMENTS 5,209,308 A * 5/1993 Sasaki ................. B25B 23/0064
173/178
5,360,073 A * 11/1994 Akazawa ............ B25B 23/0064
173/15
(Continued)

FOREIGN PATENT DOCUMENTS

DE       103 08 272 A1    10/2003
JP       H05-253854 A     10/1993
(Continued)

OTHER PUBLICATIONS

Jul. 17, 2015 Office Action issued in German Patent Application No. 10 2014 016 441.1.
(Continued)

*Primary Examiner* — Scott A. Smith
(74) *Attorney, Agent, or Firm* — Oliff PLC

(57) ABSTRACT

It is an object of the invention to provide a technique for enhancing the operability of a power tool.
A representative screwdriver 100 is provided which has a motor 110 and a driving mechanism 120. The driving mechanism 120 has a rotation transmitting mechanism including a driving cam 137 and a driven cam 157, and a cam engagement state is switched by movement of the spindle 150 in a longitudinal direction of the spindle. The position of the spindle 150 in the longitudinal direction is detected by a detecting mechanism 162 that is disposed on the opposite side of the rotation transmitting mechanism from a front end region in the longitudinal direction of the spindle 150. A controller 180 controls the rotation speed of the motor 110 based on the detection result of the detecting mechanism 162 and drives the motor 110.

17 Claims, 9 Drawing Sheets

(51) Int. Cl.
  *B25B 21/00*   (2006.01)
  *B23B 45/00*   (2006.01)
  *B25B 23/14*   (2006.01)
  *B25B 23/00*   (2006.01)
(52) U.S. Cl.
  CPC ........ *B25B 23/0064* (2013.01); *B25B 23/141* (2013.01); *B25B 23/147* (2013.01)
(58) Field of Classification Search
  USPC ... 173/15, 176, 178, 48, 104, 213, 217, 216, 173/20; 81/429, 467, 473, 474, 475, 470, 81/57.14
  See application file for complete search history.

(56) References Cited

U.S. PATENT DOCUMENTS

| | | | | |
|---|---|---|---|---|
| 5,524,512 | A * | 6/1996 | Wolfe | B25B 23/0064 81/429 |
| 5,881,613 | A * | 3/1999 | Han | B25B 23/0064 408/241 S |
| 5,918,685 | A * | 7/1999 | Ulbrich | B23B 49/006 173/15 |
| 6,257,351 | B1 * | 7/2001 | Ark | A61B 17/1626 173/178 |
| 6,851,343 | B2 * | 2/2005 | Sasaki | B25B 23/0064 173/15 |
| 7,234,536 | B2 * | 6/2007 | Scholl | B25B 23/14 173/1 |
| 7,469,753 | B2 * | 12/2008 | Klemm | B23B 45/008 173/176 |
| 7,556,103 | B2 * | 7/2009 | Matsunaga | B25B 23/141 173/176 |
| 7,669,507 | B2 * | 3/2010 | Furusawa | B25B 21/00 81/475 |
| 7,762,349 | B2 * | 7/2010 | Trautner | B23B 45/008 173/104 |
| 7,882,900 | B2 * | 2/2011 | Borinato | B23B 45/008 173/176 |
| 7,980,324 | B2 * | 7/2011 | Bixler | B25F 5/001 173/176 |
| 8,087,474 | B2 * | 1/2012 | Shinma | B25D 16/006 173/109 |
| 8,944,179 | B2 * | 2/2015 | Ukai | B25B 21/008 173/178 |
| 2003/0233917 | A1 | 12/2003 | Sasaki | |
| 2012/0175139 | A1 | 7/2012 | Ukai et al. | |

FOREIGN PATENT DOCUMENTS

| | | |
|---|---|---|
| JP | 2012-130989 A | 7/2012 |
| JP | A-2012-135845 | 7/2012 |

OTHER PUBLICATIONS

Mar. 15, 2017 Office Action issued in Japanese Patent Application No. 2013-231610.

\* cited by examiner

POWER TOOL

TECHNICAL FIELD

The present invention relates to a power tool which rotationally drives a tool accessory.

BACKGROUND ART

Japanese Unexamined Patent Application Publication (JP-A) No. 2012-135845 discloses a screwdriver that rotationally drives a driver bit. In this screwdriver, a spindle that holds the driver bit is arranged to be movable in its longitudinal direction.

A clutch detecting mechanism detects engagement of a clutch which is caused by movement of the spindle and a control part controls driving of a driving motor based on the detection result.

SUMMARY OF THE INVENTION

Problem to be Solved by the Invention

In the above-described screwdriver, however, the clutch detecting mechanism is provided radially outward of the clutch and in front of the motor. Therefore, the center of gravity of the screwdriver is set at a position close to the front end region of the driver bit. Specifically, the center of gravity of the power tool is located in a front region, so that the power tool is not rendered user-friendly for a user who holds the power tool to perform a predetermined operation. Accordingly, it is an object of the present invention to provide a technique for enhancing the operability of the power tool.

Invention for Solving the Problem

The above-described problem is solved by the present invention as defined in claim 1. According to a preferred aspect of a power tool of the present invention, the power tool is provided which rotationally drives a tool accessory around a prescribed axial direction. The power tool has a tool body, a rotary shaft that holds the tool accessory in a front end region of the tool body such that a tip of the tool accessory protrudes from the tool body, a brushless motor having an output shaft, an operating member that is manually operated by a user to drive the brushless motor, and a rotation transmitting mechanism that transmits rotation of the output shaft to the rotary shaft. The rotary shaft is configured to be movable between a first position on the front end region side of the tool body and a second position apart from the front end region in the axial direction. Typically, the first position is defined as a front region of the power tool which faces the workpiece during operation, and the second position is defined as a rear region of the power tool which is located apart from the workpiece during operation.

The power tool further has a detecting mechanism that detects the position of the rotary shaft in the axial direction, and a controller that controls the rotation speed of the brushless motor according to the position of the rotary shaft detected by the detecting mechanism. The rotation transmitting mechanism is configured to interrupt transmission of rotation of the output shaft to the rotary shaft when the rotary shaft is located at the first position and transmit rotation of the output shaft to the rotary shaft when the rotary shaft is located at the second position. Further, the detecting mechanism is arranged such that the detecting mechanism and the front end region of the tool body hold the rotation transmitting mechanism therebetween in the axial direction. The controller has a first drive mode of driving the brushless motor at a first rotation speed when the rotary shaft is located at the first position, and a second drive mode of driving the brushless motor at a second rotation speed exceeding the first rotation speed when the rotary shaft is located at the second position. After the operating member is operated, the controller switches between the first drive mode and the second drive mode based on the position of the rotary shaft in the axial direction and drives the brushless motor.

According to the present invention, the detecting mechanism is disposed in a region on the opposite side of the rotation transmitting mechanism from the front end region in the axial direction. By such arrangement of the detecting mechanism, the center of gravity of the power tool is set at a position close to a region on the opposite side of the rotation transmitting mechanism from the front end region. With a typical power tool, the user performs a predetermined operation while holding a region of the power tool on the opposite side from the front end region to which the tool accessory is coupled. Therefore, the center of gravity of the power tool is located in a region of the power tool held by the user, so that the operability of the power tool is enhanced. Further, with the structure in which the brushless motor is provided as the motor for rotationally driving the tool accessory, the rotation speed of the motor, or the first rotation speed and the second rotation speed can be more accurately controlled than a motor with a brush.

According to a further aspect of the power tool of the present invention, the rotary shaft is disposed in parallel to the output shaft at a position offset from the output shaft. Therefore, the detecting mechanism is rationally disposed on the opposite side of the rotation transmitting mechanism from the front end region.

According to a further aspect of the power tool of the present invention, the power tool has a movable member that moves together with the rotary shaft in the axial direction. The movable member has a base end connected to the rotary shaft and a tip protruding from the rotary shaft. The tip is placed on the opposite side of the rotation transmitting mechanism from the front end region in the axial direction. Typically, the movable member is formed as an elongate member. The rotary shaft that holds the tool accessory is disposed closer to the front end region of the power tool than the rotation transmitting mechanism. Therefore, typically, the movable member connected to the rotary shaft extends through the rotation transmitting mechanism and its tip is placed on the opposite side of the rotation transmitting mechanism from the front end region. Further, the movable member may be disposed outside the rotation transmitting mechanism in the axial direction without extending through the rotation transmitting mechanism such that the tip of the movable member is arranged on the opposite side of the rotation transmitting mechanism from the front end region.

According to this aspect, the movable member is provided which moves together with the rotary shaft. Therefore, the detecting mechanism detects the tip of the movable member which is placed on the opposite side of the rotation transmitting mechanism from the front end region, so that the position of the rotary shaft is detected.

According to a further aspect of the power tool of the present invention, the rotation transmitting mechanism has a driving part that is rotated by the output shaft and a driven part that can engage with the driving part, and rotation of the output shaft is transmitted to the rotary shaft by engagement between the driving part and the driven part. The movable member is arranged to extend through the driving part. Specifically, the movable member extends through the driving part in the axial direction.

According to a further aspect of the power tool of the present invention, the movable member has a magnet provided on the tip side. The detecting mechanism is configured as a magnetic sensor that detects the position of the rotary shaft by detecting the magnetic field of the magnet.

According to this aspect, by using the magnetic sensor as the detecting mechanism, it can detect the position of the movable member as the position of the rotary shaft without directly coming in contact with the movable member. Therefore, the magnetic sensor as the detecting mechanism is rationally disposed in a region on the opposite side of the rotation transmitting mechanism from the front end region.

According to a further aspect of the power tool of the present invention, the power tool has an intervening member disposed between the movable member and the detecting mechanism. The detecting mechanism is configured as a switch that is operated by the intervening member when the intervening member is moved by movement of the movable member. Further, by using the intervening member, it is preferred that the amount of movement of the movable member is enlarged by the intervening member and transmitted to the detecting mechanism.

According to this aspect, a switch that is mechanically operated by the movable member is used as the detecting mechanism. By provision of this switch, the position of the rotary shaft is reliably detected.

According to a further aspect of the power tool of the present invention, the detecting mechanism, is disposed in a region other than on an axis of the movable member. Therefore, the detecting mechanism does not prevent the movement of the movable member in its axial direction. Further, the power tool is reduced in size in the axial direction.

According to a further aspect of the power tool of the present invention, the power tool has a first rotation speed setting member that can be manually operated by the user. The first rotation speed is selectively set by the first rotation speed setting member. Further, the power tool has a second rotation speed setting member that can be manually operated by the user, and the second rotation speed is selectively set by the second rotation speed setting member.

According to this aspect, at least one of the first rotation speed and the second rotation speed is set by the user. Therefore, the user can select the rotation speed of the brushless motor according to the operation mode.

According to a further aspect of the power tool of the present invention, the power tool is configured to be capable of disabling the first drive mode. The second drive mode is used during operation. Therefore, the power consumption of the power tool is reduced by disabling the first drive mode according to the operation mode.

Effect of the Invention

According to the present invention, a power tool is provided which is enhanced in operability.

REPRESENTATIVE EMBODIMENT OF THE INVENTION

Figure 1:
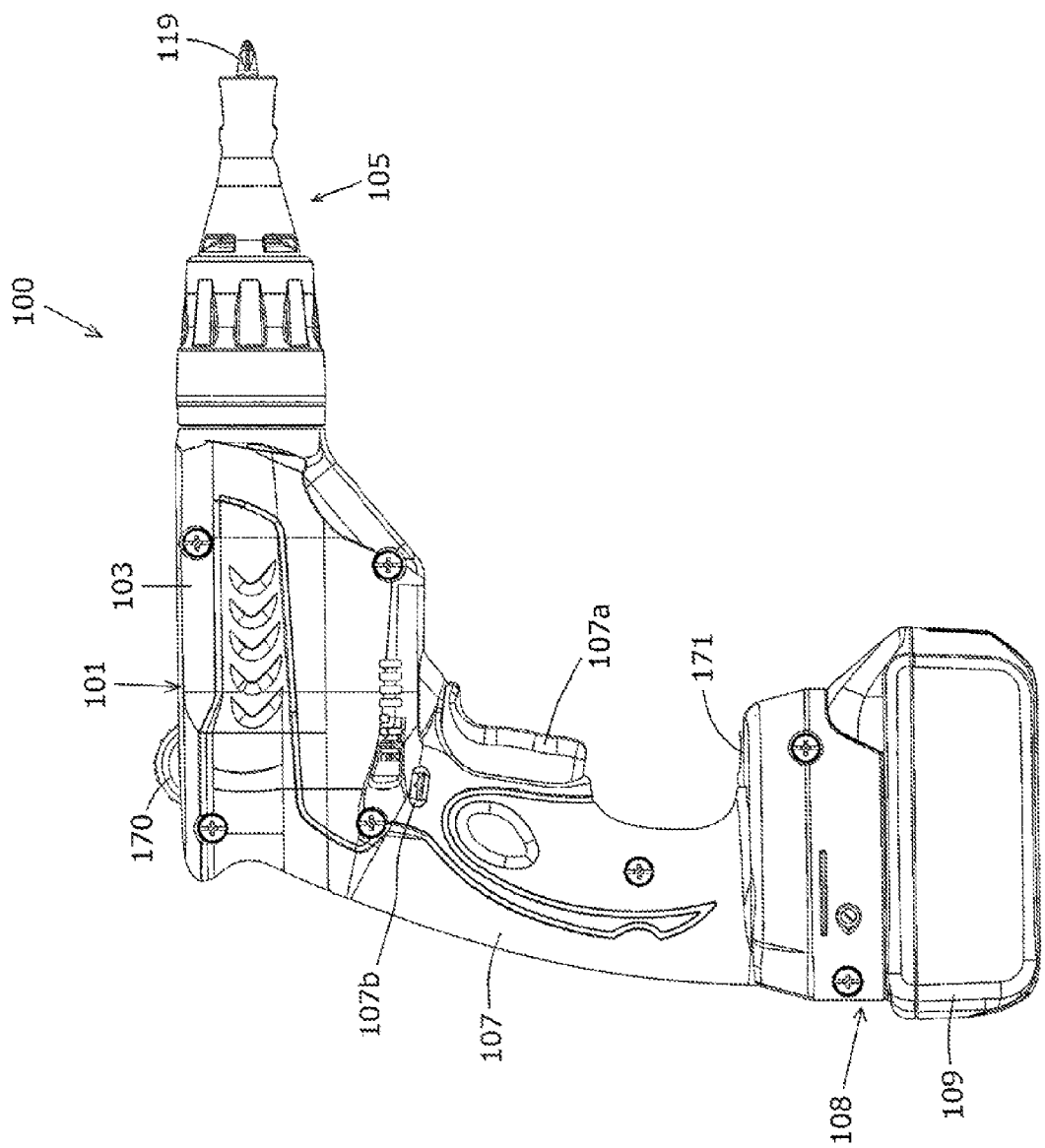
FIG. 1 is a side view showing a screwdriver according to a representative embodiment.

A representative embodiment of the present invention is now described with reference to FIGS. 1 to 6. As shown in FIG. 1, a screwdriver 100 that performs a screw tightening operation on a workpiece such as a gypsum board is configured as a representative example of a power tool according to the present invention. The screwdriver 100 mainly includes a body 101 and a handle 107.

Figure 2:
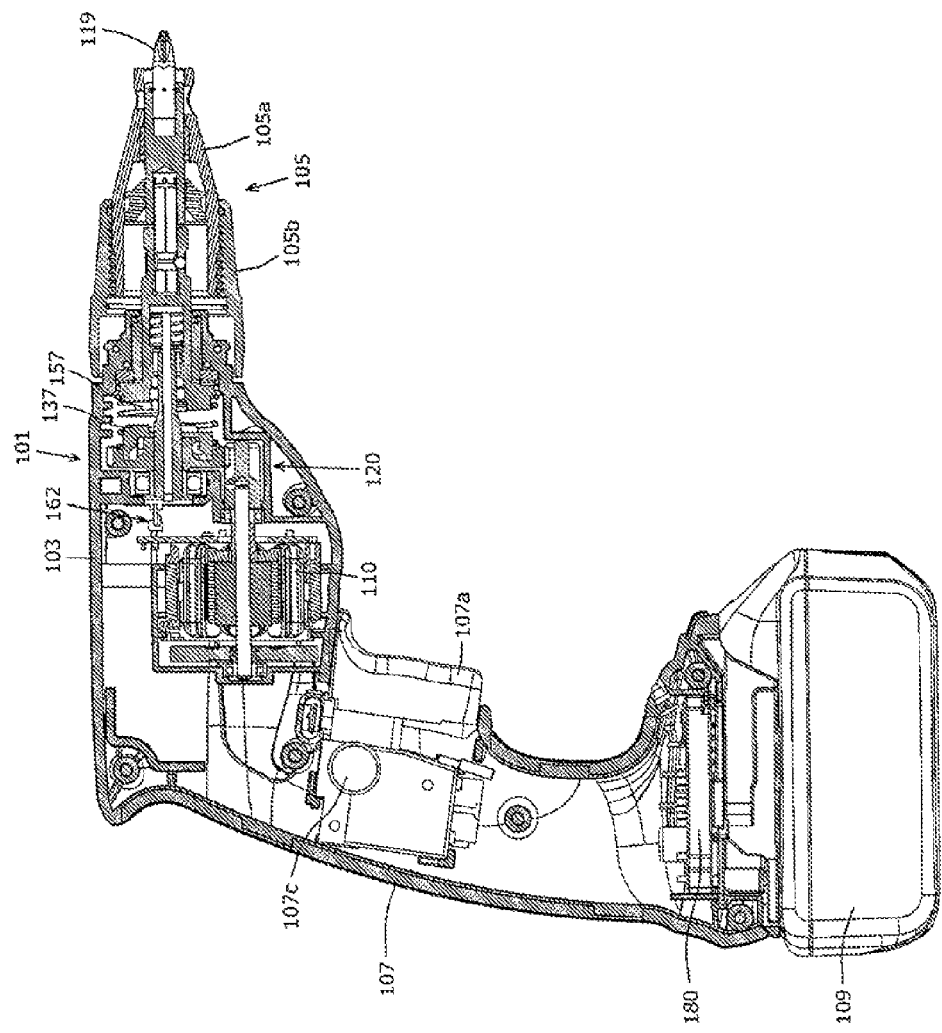
FIG. 2 is a sectional side view of the screwdriver.

As shown in FIG. 1, the body 101 mainly includes a body housing 103, a locator 105 and the handle 107. As shown in FIG. 2, the body housing 103 houses a motor 110 and a driving mechanism 120. The locator 105 is attached to a front end region of the body housing 103. The locator 105 includes abase end part 105b connected to the body housing 103 and a front end part 105a that can rotate with respect to the base end part 105b. A tool bit 119 is removably coupled to the driving mechanism 120 in the front end region of the body 101. The tool bit 119 is coupled to the driving mechanism 120 such that it protrudes from the locator 105 and can move in a longitudinal direction of the tool bit 119 with respect to the locator 105. In the screwdriver 100, for the sake of convenience of explanation, the side (right side as viewed in FIG. 1) on which the tool bit 119 is coupled is referred to as the front side and the handle 107 side (left side as viewed in FIG. 1) is referred to as the rear side. In the extending direction of the handle 107, the body housing 103 side (upper side as viewed in FIG. 1) is referred to as the upper side and the distal end side of the handle 107 (lower side as viewed in FIG. 1) is referred to as the lower side. The longitudinal direction of the screwdriver 100 is an example embodiment that corresponds to the "prescribed axial direction" according to the present invention. Therefore, the longitudinal direction of the tool bit 119 coincides with the prescribed axial direction.

As shown in FIG. 1, a base end region of the handle 107 is connected to a rear end region of the body housing 103. A trigger 107a and a selector switch 107 are provided, on the handle 107. Further, a battery mounting part 108 to which a battery pack 109 is detachably mounted is formed in a distal end region of the handle 107. By operating the trigger 107a, current is supplied from the battery pack 109 and the motor 110 is driven. Further, by operating the selector switch 107b, the direction of rotation of an output shaft 111 of the motor 110 is changed. Specifically, the output shaft 111 is selectively driven in a direction of either normal rotation or reverse rotation. The trigger 107a is an example embodiment that corresponds to the "operating member" according to the present invention.

Figure 3:
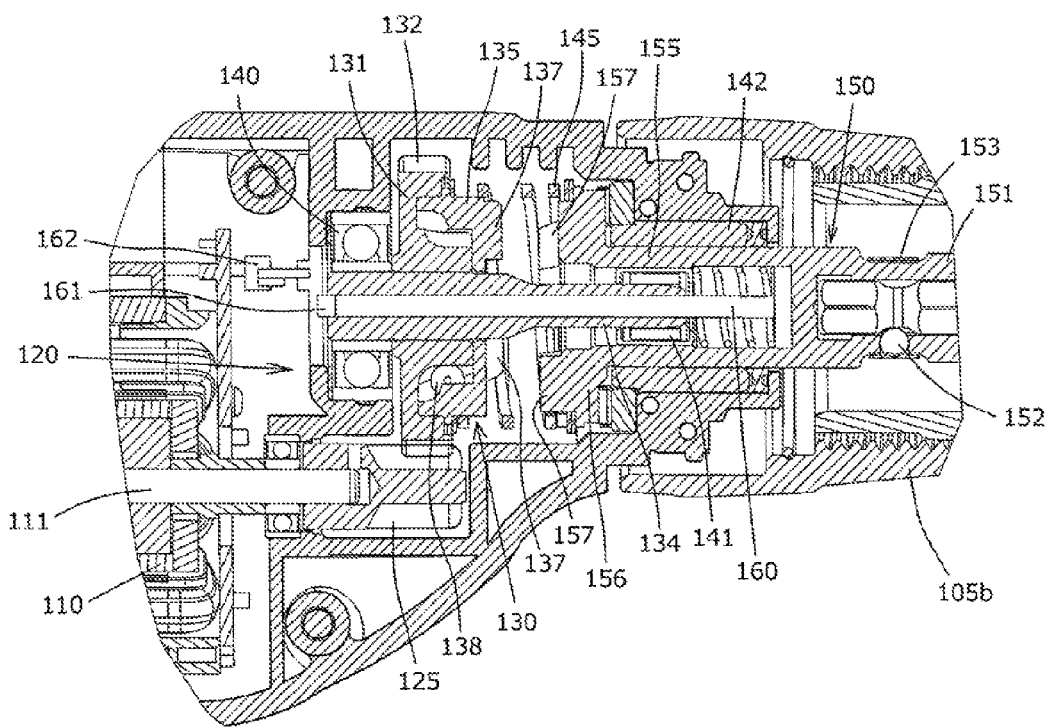
FIG. 3 is a partially enlarged sectional view of FIG. 2.

As shown in FIGS. 2 and 3, the driving mechanism 120 mainly includes a driving gear 125, a rotation transmitting gear 130, a coil spring 145 and a spindle 150.

As shown in FIG. 3, the driving gear 125 is fitted onto the output shaft 111. The rotation transmitting gear 130 engages with the driving gear 125 and is driven by the motor 110. Further, the motor 110 is configured as a brushless motor. The motor 110 and the output shaft 111 are example embodiments that correspond to the "brushless motor" and the "output shaft", respectively, according to the present invention.

As shown in FIG. 3, the rotation transmitting gear 130 mainly includes a driving member 131, a support shaft 134, a driven member 135 and a ball 138. The support shaft 134 extends through a region of the rotation center of the driving member 131 and the driven member 135, and the driving member 131 and the driven member 135 are coaxially disposed via the support shaft 134. The driving member 131 is coupled to the support shaft 134 and rotates together with the support shaft 134. The driven member 135 is fitted onto the outer periphery of the support shaft 134 and is held such that it can rotate with respect to the support shaft 134. Further, one end region (rear end region) of the support shaft 134 is supported by the body housing 103 via a bearing 140, and the other end region (front end region) is inserted into the spindle 150 and is supported by the spindle 150 via a bearing 141.

A driven gear 132 is formed on the outer periphery of the driving member 131 and is engaged with the driving gear 125. The driven member 135 is disposed to face the driving member 131. Further, a driving cam 137 is formed on the side (front side) of the driven member 135 that faces the spindle 150, and the side on which the driving cam 137 is formed is biased by the coil spring 145. Specifically, the driven member 135 is biased toward the driving member 131.

As shown in FIG. 3, the ball 138 is disposed between the driving member 131 and the driven member 135, and the driven member 135 is biased toward the driving member 131 by the coil spring 145. By provision of this structure, rotation of the driving member 131 is transmitted to the driven member 135 via the ball 138.

As shown in FIG. 3, the spindle 150 mainly includes a bit holding part 151, a support shaft holding part 155 and a flange 156. The tool bit 119 is detachably coupled to the bit holding part 151. A bearing 142 is fitted onto the support shaft holding part 155 and the support shaft holding part 155 is supported by the body housing 103 via the bearing 142. Further, the support shaft holding part. 155 internally supports the support shaft 134 via the bearing 141. The flange 156 is formed on the rear end of the spindle 150 and protrudes outward in the radial direction of the spindle 150 from the support shaft holding part 155. A driven cam 157 is formed on a surface (rear surface) of the flange 156 which faces the driven member 135 and is engaged with the driving cam 137. The coil spring 145 is disposed between the flange 156 and the driven member 135. Therefore, the driven member 135 is biased rearward and the spindle 150 is biased forward. The spindle 150 is an example embodiment that corresponds to the "rotary shaft" according to the present invention.

When the motor 110 is driven, the driving gear 125 rotates and the driven gear 132 engaged with the driving gear 125 is rotated. At this time, the driving member 131 and the driven member 135 are held in contact with each other by the biasing force of the coil spring 145, and rotation of the driving member 131 is transmitted to the driven member 135 via the ball 138. Specifically, the driving member 131 and the driven member 135 rotate together.

As shown in FIG. 3, when the tool bit. 119 is not pressed against the workpiece such as a screw, the driven cam 157 of the spindle 150 is placed apart from the driving cam 137 of the rotation transmitting gear 130 by the biasing force of the coil spring 145. Therefore, rotation of the rotation transmitting gear 130 is not transmitted to the spindle 150.

Figure 4:
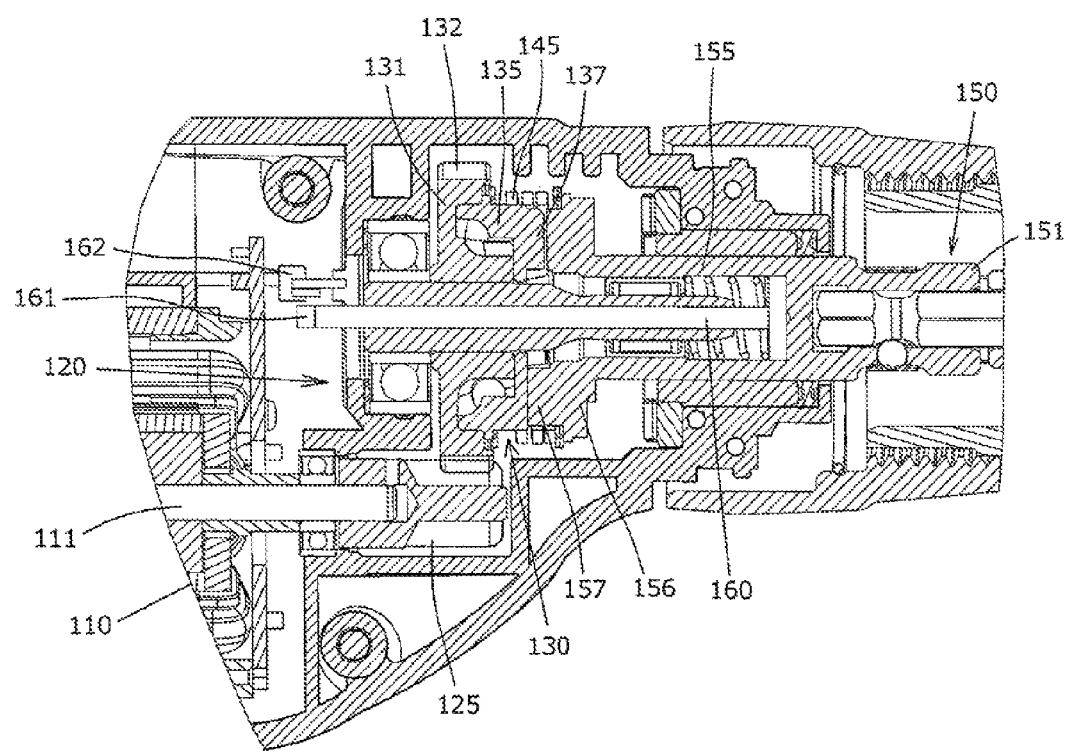
FIG. 4 is a partially enlarged sectional view showing a spindle located in a rearward position in FIG. 3.

As shown in FIG. 4, when the tool bit 119 is pressed against a screw and the spindle 150 is moved rearward against the biasing force of the coil spring 145, the driven cam 157 of the spindle 150 engages with the driving can 137 of the rotation transmitting gear 130. Thus, rotation of the rotation transmitting gear 130 is transmitted to the spindle 150. Therefore, the tool bit 119 performs a screw tightening operation of turning the screw. The driving cam 137 and the driven cam 157 form the "rotation transmitting mechanism" according to the present invention.

In the screwdriver 100, typically, the motor 110 is driven by operating the trigger 107a. Further, as shown in FIG. 2, a trigger lock switch 107c is provided on the handle 107 and forms a trigger lock mechanism for holding the trigger 107a at a prescribed position. When the trigger lock switch 107c is operated, the trigger 107a is held in that position where it is at that time. Further description of the trigger lock mechanism is omitted.

Generally, in a power tool in which rotation is transmitted by engagement between the driving can 137 and the driven cam 157, if the driving cam 137 is rotated at high rotation speed when the driving cam 137 and the driven cam 157 are switched from the disengaged state to the engaged state, a greater friction is generated by contact between the rotating driving cam 137 and the non-rotating driven cam 157. Therefore, when the driving cam 137 and the driven cam 157 are engaged with each other, it is preferred that the driving cam 137 is stopped or rotated at low rotation speed.

In operation, the tool bit 119 is driven at relatively high rotation speed. Therefore, if the driving cam 137 is stopped when the driving earn 137 and the driven cam 157 are engaged with each other to perform the operation, a time lag occurs until the spindle 150 (the tool bit 119) reaches a prescribed driving rotation speed after engagement between the driving cam 137 and the driven cam 157.

Further, a user may perform the screw tightening operation while adjusting the rotation speed of the tool bit 119 during operation. In such an operation mode, it is necessary to drive the motor 110 while reflecting the user's intention in real time.

In order to cope with various operation modes as described above, in the screwdriver 100 of this embodiment, a controller 180 is configured to control the rotation speed of the motor 110 according to a set drive mode, based on the engaged state and the disengaged state between the driving cam 137 and the driven cam 157.

Specifically, in order to detect the engaged state and the disengaged state between the driving cam 137 and the driven cam 157, a spindle position detecting shaft 160 is connected to the spindle 150. The spindle position detecting shaft 160 extends from the support shaft holding part 155 rearward of the support shaft 134 through the support shaft 134. Specifically, the spindle position detecting shaft 160 moves and rotates together with the spindle 150. A magnet 161 is attached to the rear end of the spindle position detecting shaft 160 so as to have an N pole on its front side and an S pole on its rear side. The spindle position detecting shaft 160 is an example embodiment that corresponds to the "movable member" according to the present invention.

Figure 6:
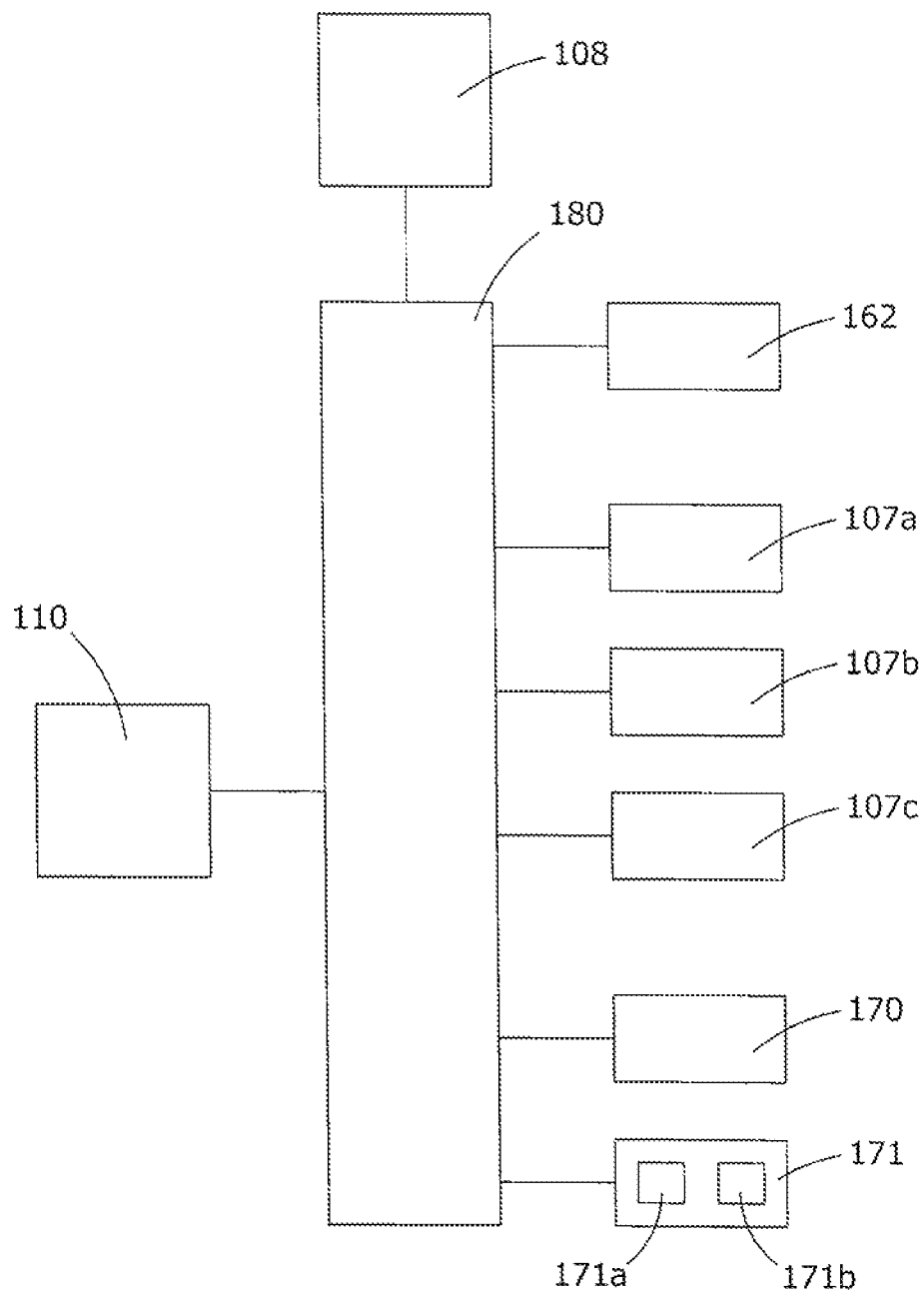
FIG. 6 is a block diagram showing a control system of the screwdriver.

A magnetic sensor 162 is disposed behind the rotation transmitting gear 130. Specifically, the magnetic sensor 162 is disposed such that the front end of the locator 105 and the magnetic sensor 162 holds the rotation transmitting gear 130 therebetween. The magnetic sensor 162 is disposed at an upper position other than on the axis of the spindle position detecting shaft 160 behind the driving member 131 of the rotation transmitting gear 130. As shown in FIG. 6, the magnetic sensor 162 is connected to the controller 180. Further, the trigger 107a, the selector switch 107h, the trigger lock switch 107c, an idling rotation speed setting dial 170, a driving rotation speed setting part 171 and the motor 110 are connected to the controller 180. The controller 180 detects the position of the spindle 150 via the spindle position detecting shaft 160 based on the detection result of the magnetic sensor 162. Specifically, the position of the spindle 150 in its longitudinal direction is detected based on the change of a magnetic field of the magnet 161 caused by the movement of the spindle 150 in the longitudinal direction. The magnetic sensor 162 is an example embodiment that corresponds to the "detecting mechanism" according to the present invention.

As shown in FIG. 3, when the spindle 150 is biased by the coil spring 145 and is located in a forward position close to the front end of the locator 105, the driven cam 157 is not engaged with the driving cam 137. Specifically, the driving cam 137 and the driven cam 157 are in the disengaged state (hereinafter referred to as the cam disengaged state). This position (forward position) of the spindle 150 is an example embodiment that corresponds to the "first position" according to the present invention. Further, as shown in FIG. 4, when the tool bit 119 is pressed against the workpiece (screw) and the spindle 150 is located in the rearward position apart from the front end of the locator 105, the driving cam 137 is engaged with the driven cam 157. Specifically, the driving cam 137 and the driven cam 157 are in the engaged state (hereinafter referred to as the cam engaged state). This position (rearward position) of the spindle 150 is an example embodiment that corresponds to the "second position" according to the present invention.

The magnetic sensor 162 detects the position of the spindle 150 in the longitudinal direction of the screwdriver 100 so that the engaged state and the disengaged state between the driving cam 137 and the driven cam 157 are detected. In other words, the magnetic sensor 162 detects the engaged state and the disengaged state between the driving cam 137 and the driven cam 157. Then the controller 180 selects each drive mode as follows based on the cam engaged state, the earn disengaged state and the operation of the trigger 107a, and drives the motor 110 to perform the screw tightening operation. Specifically, by pressing the spindle 150 (the tool bit 119) against the workpiece while operating the trigger 107a, the screwdriver 100 is switched from the cam disengaged state to the cam engaged state. Thus, the motor 110 is driven at a prescribed rotation speed and the spindle 150 (the tool bit 119) is rotated. In this manner, by pressing the spindle 150 (the tool bit 119), rotation of the motor 110 is transmitted to the spindle 150 (the tool bit 119) and the tool bit 119 is started (rotated). This function is also referred to as "pushing start".

(Idling Drive Mode)

An idling drive mode is a drive mode in which the motor 110 is driven at the idling rotation speed in the cam disengaged state and is driven at the driving rotation speed (also referred to as the command rotation speed) in the cam engaged state. Specifically, when the trigger 107a is operated and the magnetic sensor 162 detects that the spindle 150 is located in the forward position, the controller 180 drives the motor 110 at the idling rotation speed. The idling rotation speed and the driving rotation speed are example embodiments that correspond to the "first rotation speed" and the "second rotation speed", respectively, according to the present invention. Further, the drive mode in which the motor 110 is driven at the idling rotation speed in the cam disengaged state is an example embodiment that corresponds to the "first drive mode" according to the present invention. The drive mode in which the motor 110 is driven at the driving rotation speed in the cam engaged state is an example embodiment that corresponds to the "second drive mode" according to the present invention.

The idling rotation speed is selected (set) by an idling rotation speed setting dial 170 that is manually operated by the user. Specifically, the user sets the idling rotation speed according to the operation mode. As shown in FIG. 1, the idling rotation speed setting dial 170 is provided above the handle 107. The idling rotation speed is set, for example, to 30%, 50% or 100% of the rated rotation speed of the motor when the rated rotation speed of the motor is set to 100%. The idling rotation speed setting dial 170 is an example embodiment that corresponds to the "first rotation speed setting member" according to the present invention.

Figure 5:
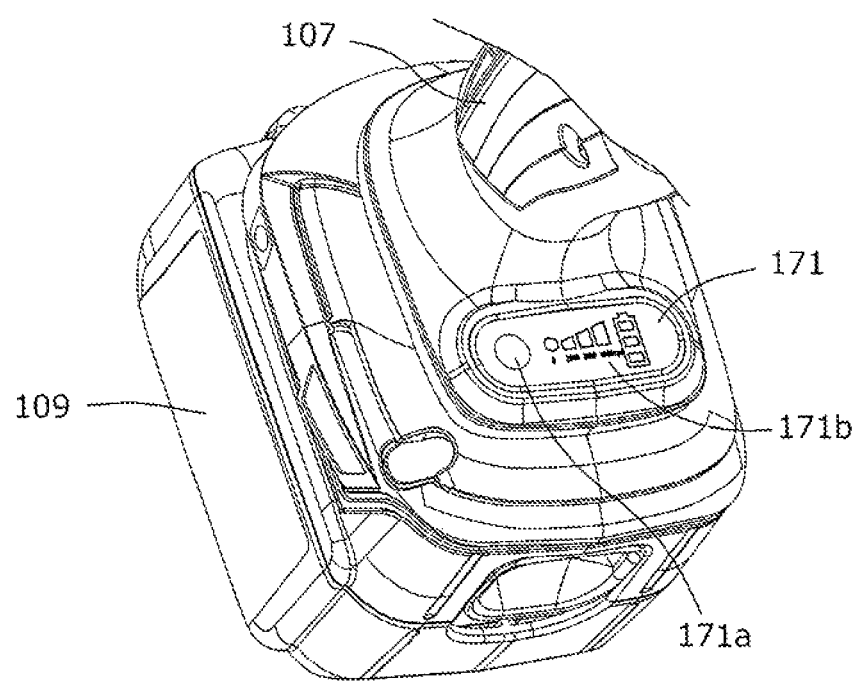
FIG. 5 is a perspective view showing a driving rotation speed setting switch.

The driving rotation speed is selected (set) with a driving rotation speed setting switch 171a that is manually operated by the user. Specifically, the user sets the driving rotation speed according to the operation mode. As shown in FIG. 5, the driving rotation speed setting switch 171a is provided in a driving rotation speed setting part 171 disposed on the top of the battery mounting part 108. The driving rotation speed is set, for example, to 10% to 100% of the rated rotation speed of the motor in 10% increments when the rated rotation speed of the motor is set to 100%. A driving rotation speed display panel 171b is provided in the driving rotation speed setting part 171. The driving rotation speed set with the driving rotation speed setting switch 171a is displayed on the driving rotation speed display panel 171b. The driving rotation speed setting switch 171a is an example embodiment that corresponds to the "second rotation speed setting member" according to the present invention.

In the idling drive mode, when the selected idling rotation speed is higher than the selected driving rotation speed, the controller 180 sets the idling rotation speed to the same speed as the selected driving rotation speed. Then, when the trigger 107a is operated, the controller 180 drives the motor 110 at the selected driving rotation speed, that is to say, the idling rotation speed set to the same speed as the driving rotation speed, regardless of the position of the spindle 150. Therefore, when the selected idling rotation speed is higher than the selected driving rotation speed, the above-described "pushing start" is disabled.

By the above-described idling drive mode, the motor 110 is driven at the idling rotation speed in the cam disengaged state, so that the time lag is reduced until the rotation speed of the motor 110 reaches the driving rotation speed after detection of the cam engaged state. Further, when the cam engaged state is detected, the motor 110 is driven at the prescribed selected driving rotation speed and the spindle 150 is rotated. As a result, the screw tightening operation is performed. Therefore, the user can change the output of the screwdriver 100 by selecting the driving rotation speed of the motor 110.

(Non-Idling Drive Mode)

A non-idling drive mode is a drive mode in which the motor 110 is not driven in the cam disengaged state and is driven at the driving rotation speed in the cam engaged state. Specifically, even if the trigger 107a is operated, the controller 180 does not drive the motor 110 when the magnetic sensor 162 detects that the spindle 150 is located in the forward position. On the other hand, when the trigger 107a is operated and the magnetic sensor 162 detects that the spindle 150 is located in the rearward position, the controller 180 drives the motor 110 at the set driving rotation speed.

In the non-idling drive mode, the motor 110 is not driven in an idling condition. Therefore, the setting of "OFF" is provided in the idling rotation speed setting dial 170. When the OFF is selected, setting of the idling rotation speed with the idling rotation speed setting dial 170 is disabled. In other words, the idling rotation speed is set to 0% of the rated rotation speed of the motor. Like in the idling drive mode, the driving rotation speed is set with the driving rotation speed setting switch 171a.

By the above-described non-idling drive mode, the power consumption of the motor 110 by the idling drive of the motor 111 is reduced compared with the idling drive mode. Also in the non-idling drive mode, like in the idling drive mode, when the trigger 107a is operated and the cam engaged state is detected, the motor 110 is driven at the prescribed selected driving rotation speed by the controller 180 and then the spindle 150 is rotated. As a result, the screw tightening operation is performed. Therefore, the user can change the output of the screwdriver 100 by selecting the driving rotation speed of the motor 110.

In the idling drive mode and the non-idling drive mode, the user can also perform the operation by pressing the tool bit 119 against the workpiece in the state in which the trigger 107a is held in the prescribed position by operating the trigger lock switch 107c. Specifically, when the user presses the tool bit 119 against the workpiece without operating the trigger 107a, the controller 180 controls driving of the motor 110 based on the position of the spindle 150.

(Trigger Drive Mode)

In the above-described idling drive mode and non-idling drive mode, the controller 180 drives the motor 110 at the prescribed rotation speed based on the engaged state and the disengaged state between the driving cam 137 and the driven cam 157 when the trigger 107a is operated. In the trigger drive mode, the controller 180 controls the rotation speed of the motor 110 based on the amount of operation (movement) of the trigger 107a.

Specifically, a switch (not shown) for switching to the trigger drive mode is provided, and the drive mode is switched between the trigger drive mode and the idling drive mode and the non-idling drive mode with this switch.

In the trigger drive mode, each trigger operation amount is set to linearly change between 0 and 1 when the trigger operation amount of the non-operated trigger 107a is set to 0 and the trigger operation amount of the fully depressed trigger 107a is set to 1. When the cam disengaged state is detected, the controller 180 drives the motor 110 at the rotation speed obtained by multiplying the idling rotation speed set with the idling rotation speed setting dial 170 by the value from 0 to 1 corresponding to the trigger operation amount. When the cam engaged state is detected, the controller 180 drives the motor 110 at the rotation speed obtained by multiplying the driving rotation speed set with the driving rotation speed setting dial 171a by the value from 0 to 1 corresponding to the trigger operation amount.

By the above-described trigger drive mode, the time lag is reduced until the rotation speed of the motor 110 reaches a prescribed rotation speed corresponding to the trigger operation amount with respect to the driving rotation speed after detection of the cam engaged state. Further, when the cam engaged state is detected, the motor 110 is driven at the prescribed rotation speed corresponding to the trigger operation amount and the spindle 150 is rotated. As a result, the screw tightening operation is performed. Therefore, the user can select the maximum driving rotation speed of the motor 110 when driving the motor 110 and adjust the driving rotation speed with the trigger 107a. As a result, the output of the screwdriver 100 can be more effectively changed.

By performing the screw tightening operation by the above-described drive modes, the screw is screwed in the workpiece (such as wood). When the front surface of the locator 105 comes in contact with the workpiece by movement of the screw, the spindle 150 holding the tool bit 119 gradually moves toward the front of the screwdriver 100 by the biasing force of the coil spring 145. Thus, the driven gear 157 is disengaged from the driving gear 137 and transmission of rotation of the motor 110 to the spindle 150 is interrupted. As a result, the screw is screwed into the workpiece up to a prescribed depth and the screw tightening operation is completed. Further, the prescribed depth to which the screw is screwed in, or the distance from the screw head held by the tool bit 119 to the front surface of the locator 105, can be changed by the user. Specifically, the user can move the front end part 105a of the locator 105 in the longitudinal direction of the screwdriver 100 by turning the front end part 105a of the locator 105 with respect to the base end part 105b, so that the screwing depth is adjusted.

(Screw Removing Operation)

In a screw removing operation for removing the screw screwed into the workpiece, the screwdriver 100 reversely rotates the screw to remove the screw from the workpiece. Specifically, the selector switch 107b is operated to change the rotation direction of the motor 110 such that the screw removing operation is performed. Further, when the rotation direction of the motor 110 is changed to the rotation direction for the screw removing operation, the idling rotation speed and the driving rotation speed are set to the rated rotation speed of the motor.

Figure 7:
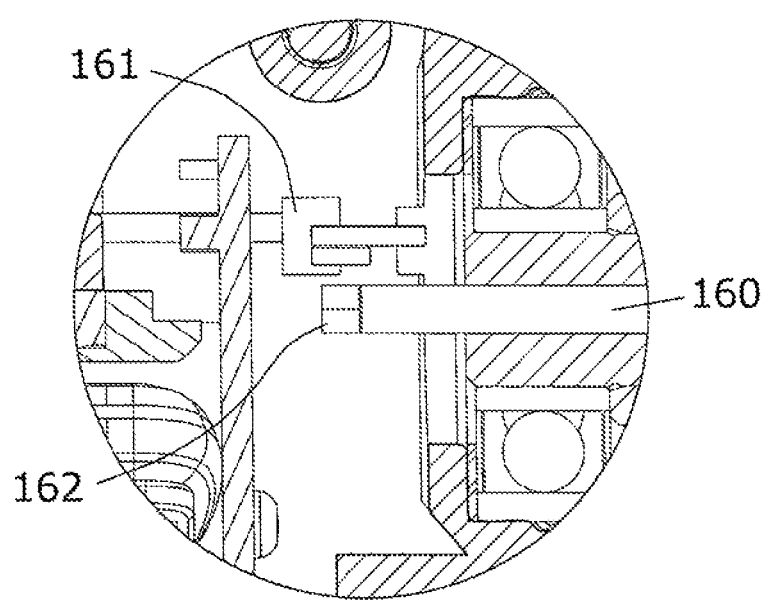
FIG. 7 is a partially enlarged view showing a sensor according to a first modification.

In the above-described embodiment, the magnet 161 is attached to the spindle position detecting shaft 160 so as to have the N pole on its front side and the S pole on its rear side, but the present invention is not limited to this. For example, like in a first modification shown in FIG. 7, the magnet 161 may be configured such that the N pole and the S pole each are arranged along the longitudinal direction. Further, by change of the magnetic field caused by rotation of the spindle position detecting shaft 160, the magnetic sensor 162 detects that the spindle 150 is rotating and thus detects that the spindle 150 is located in the rearward position. From this detection, the controller 180 may detect that the driving cam 137 and the driven cam 157 are engaged with each other.

Figure 8:
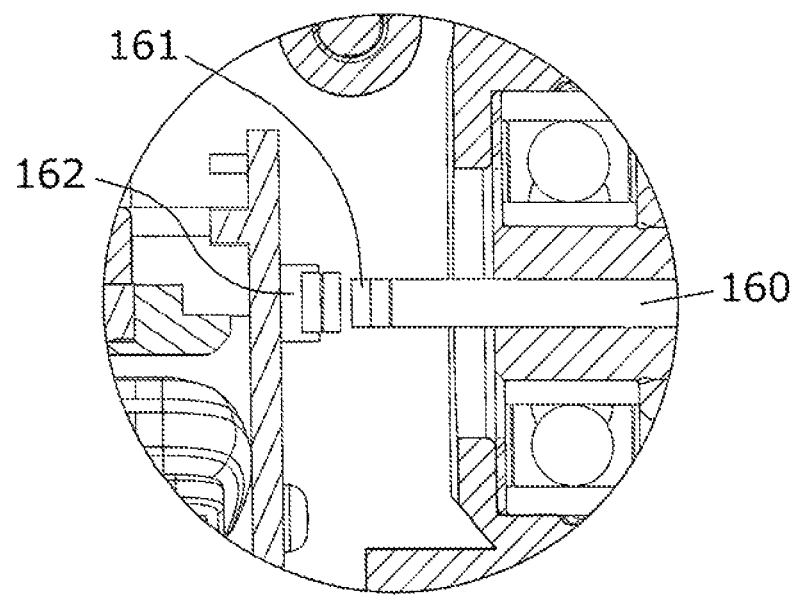
FIG. 8 is a partially enlarged view showing a sensor according to a second modification.

Further, like in a second modification shown in FIG. 8, the magnetic sensor 162 may be provided on the axis of the spindle position detecting shaft 160.

Figure 9:
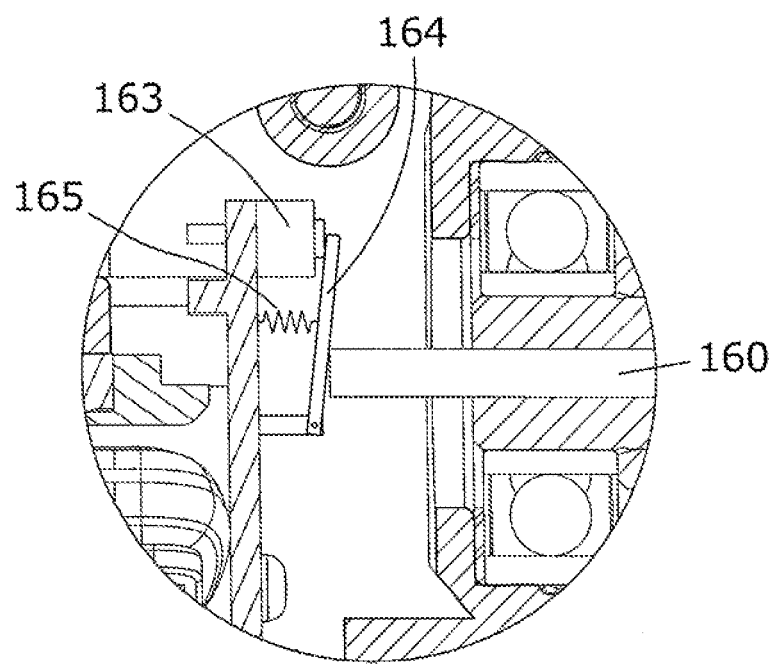
FIG. 9 is a partially enlarged view showing a sensor according to a third modification.

Like in a third modification shown in FIG. 9, the position of the spindle 150 may be detected without providing a magnet and a magnetic sensor. Specifically, a push switch 163, an operating panel 164 for operating the push switch 163 and a spring 165 that biases the operating panel 164 are provided. The operating panel 164 is configured to rotate on a fulcrum in its one end region and to operate the push switch 163 in the other end region. The spindle position detecting shaft 160 comes in contact with the one end region (the fulcrum side) of the operating panel 164. The operating panel 164 is pressed against the biasing three of the spring 165 by the rearward movement of the spindle 150 so that the push switch 163 is operated. By operation of the push switch 163, it is detected that the spindle 150 is located in the rearward position or that the driving gear 137 and the driven gear 157 are engaged with each other. Further, by contact of the spindle position detecting shaft 160 with the fulcrum side of the operating, panel 164, the movement of the spindle 150 is enlarged by the principle of leverage and transmitted to the push switch 163. Therefore, the screwdriver 100 is reduced in size by setting the amount of movement of the spindle 150 smaller. The operating panel 164 is an example embodiment that corresponds to the "intervening member" according to the present invention.

According to the above-described embodiment and modifications, with the structure in which the controller 180 selects each drive mode and drives the motor 110, the user can freely select the drive mode according to each operation mode. Thus, the user-friendly screwdriver 100 is provided.

The magnetic sensor 162 or the push switch 163 is disposed rearward of the rotation transmitting gear 130. Generally, in a power tool, a spindle is disposed in front of a rotation transmitting mechanism including a gear and a shaft, but a dead space is formed rearward of the rotation transmitting mechanism. Therefore, the magnetic sensor 162 and the push switch 163 which serve as a detecting means for detecting the position of the spindle 150 are disposed in the dead space, so that the dead space is effectively utilized.

Further, the magnetic sensor 162 and the push switch 163 are disposed in a region other than on the axis of the spindle position detecting shaft 160. Therefore, the length of the power tool or the screwdriver 100 in the longitudinal direction can be shortened. Specifically, the power tool is reduced in size.

With the structure in which the brushless motor is used as the motor 110, the controller 180 can accurately control the rotation speed of the motor 110. Especially, in the power tool in which the rotation speed of the motor 110 is controlled according to each drive mode, it is effective to use the brushless motor.

In the above-described embodiment and modifications, the rotation transmitting mechanism is configured to transmit rotation of the motor 110 to the spindle 150 by engagement between the driving cam 137 and the driven cam 157, but the present invention is not limited to this. For example, an electromagnetic clutch which is controlled by the controller 180 may be provided as the rotation transmitting mechanism.

Further, in the above-described embodiment and modifications, the screwdriver 100 is explained as a representative example of the power tool, but the present invention may be applied to a drill, a hammer drill or other power tools which rotate the tool accessory.

In view of the object of the above-described invention, the power tool of this invention can have the following features.

(Aspect 1)

The power tool as defined in any one of claims 1 to 9, wherein the rotary shaft is disposed on the front end region side of the rotation transmitting mechanism in the axial direction, and the detecting mechanism is disposed further apart from the front end region than the rotation transmitting mechanism in the axial direction.

(Aspect 2)

The power tool as defined in any one of claims 1 to 9 and aspect 1, wherein:
the operating member comprises a trigger, and
in the first drive mode, the controller changes the rotation speed based on the amount of movement of the trigger with the first rotation speed as a maximum rotation speed and drives the brushless motor.

(Aspect 3)

The power tool as defined in any one of claims 1 to 9 and aspect 1 or 2, wherein:
the operating member comprises a trigger, and
in the second drive mode, the controller changes the rotation speed based on the amount of movement of the trigger with the second rotation speed as a maximum rotation speed and drives the brushless motor.

Correspondences Between the Features of the Embodiments and the Features of the Invention The above-described embodiment is a representative example for embodying the present invention, and the present invention is not limited to the structure that has been described as the representative embodiment. Correspondences between the features of the embodiment and the features of the invention are as follows.

The screwdriver 100 is an example embodiment that corresponds to the "power tool" according to the present invention.

The body 101 is an example embodiment that corresponds to the "tool body" according to the present invention.

The trigger 107a is an example embodiment that corresponds to the "operating member" according to the present invention.

The motor 110 is an example embodiment that corresponds to the "brushless motor" according to the present invention.

The output shaft 111 is an example embodiment that corresponds to the "output shaft" according to the present invention.

The rotation transmitting gear 130 is an example embodiment that corresponds to the "rotation transmitting mechanism" according to the present invention.

The rotation transmitting gear 130 is an example embodiment that corresponds to the "driving part" according to the present invention.

The driving cam 137 is an example embodiment that corresponds to the "rotation transmitting mechanism" according to the present invention.

The driving cam 137 is an example embodiment that corresponds the "driving part" according to the present invention.

The driven cam 157 is an example embodiment that corresponds to the "rotation transmitting mechanism" according to the present invention.

The driven cam 157 is an example embodiment that corresponds to the "driven part" according to the present invention.

The spindle 150 is an example embodiment that corresponds to the "rotary shaft" according to the present invention.

The spindle position detecting shaft 160 is an example embodiment that corresponds to the "movable member" according to the present invention.

The magnetic sensor 162 is an example embodiment that corresponds to the "detecting mechanism" according to the present invention.

The operating panel 164 is an example embodiment that corresponds to the "intervening member" according to the present invention.

The idling rotation speed setting dial 170 is an example embodiment that corresponds to the "first rotation speed setting member" according to the present invention.

The driving rotation speed setting switch 171a is an example embodiment that corresponds to the "second rotation speed setting member" according to the present invention.

The controller 180 is an example embodiment that corresponds to the "controller" according to the present invention.

DESCRIPTION OF THE NUMERALS 100 screwdriver
101 body
103 body housing
105 locator
107 handle
107a trigger
107b selector switch
107c trigger lock switch
108 battery mounting part
109 battery pack
110 motor
111 output shaft
119 tool bit
120 driving mechanism
125 driving gear
130 rotation transmitting mechanism
131 driving member
132 driven gear
134 support shaft
135 driven member
137 driving cam
138 ball
140 bearing
141 bearing
142 bearing
145 coil spring
150 spindle
151 bit holding part
152 ball
153 leaf spring
155 support shaft holding part
156 flange
157 driven cam
160 spindle position detecting shaft
161 magnet
162 magnetic sensor
163 push switch
164 operating panel
165 spring
170 idling rotation speed setting dial
171 driving rotation speed setting part
171a driving rotation speed setting switch
171b driving rotation speed display panel
180 controller

The invention claimed is:

1. A power tool, which rotationally drives a tool accessory around a prescribed axial direction, comprising:
a tool body,
a rotary shaft that holds the tool accessory in a front end region of the tool body such that a tip of the tool accessory protrudes from the tool body,
a brushless motor having an output shaft,
an operating member that is manually operated by a user to drive the brushless motor, and
a rotation transmitting mechanism that transmits rotation of the output shaft to the rotary shaft, wherein:
the rotary shaft is movable between a first position on a front end region side of the tool body and a second position apart from the front end region side in the axial direction,
a detecting mechanism that detects the position of the rotary shaft in the axial direction, and
a controller that controls the rotation speed of the brushless motor according to the position of the rotary shaft detected by the detecting mechanism, wherein:
the rotation transmitting mechanism interrupts transmission of rotation of the output shaft to the rotary shaft when the rotary shaft is located at the first position, and transmits rotation of the output shaft to the rotary shaft when the rotary shaft is located at the second position,
the detecting mechanism is arranged such that the detecting mechanism and the front end region hold the rotation transmitting mechanism therebetween in the axial direction,
the controller has a first mode of controlling the rotation speed of the brushless motor to a first rotation speed when the rotary shaft is located at the first position, and a second mode of controlling the rotation speed to a second rotation speed exceeding the first rotation speed when the rotary shaft is located at the second position, and
after the operating member is operated, the controller switches between the first mode and the second mode based on the position of the rotary shaft in the axial direction and controls the rotation speed of the brushless motor.

2. The power tool as defined in claim 1, wherein the rotary shaft is disposed in parallel to the output shaft at a position offset from the output shaft.

3. The power tool as defined in claim 1, comprising:
a movable member that moves together with the rotary shaft in the axial direction, wherein:
the movable member has a base end connected to the rotary shaft and a tip protruding from the rotary shaft, and the tip is placed on the opposite side of the rotation transmitting mechanism from the front end region in the axial direction.

4. The power tool as defined in claim 3, wherein:
the rotation transmitting mechanism has a driving part that is rotated by the output shaft and a driven part that can engage with the driving part,
rotation of the output shaft is transmitted to the rotary shaft by engagement between the driving part and the driven part, and
the movable member is arranged to extend through the driving part.

5. The power tool as defined in claim 3, wherein:
the movable member has a magnet provided on the tip side, and
the detecting mechanism comprises a magnetic sensor that detects the position of the rotary shaft by detecting a magnetic field of the magnet.

6. The impact tool as defined in claim 3, comprising:
an intervening member disposed between the movable member and the detecting mechanism, wherein:
the detecting mechanism comprises a switch that is operated by the intervening member when the intervening member is moved by movement of the movable member.

7. The power tool as defined in claim 3, wherein the detecting mechanism is disposed in a region other than on an axis of the movable member.

8. The power tool as defined in claim 1, comprising a first rotation speed setting member that can be manually operated by a user, wherein the first rotation speed is selectively set by the first rotation speed setting member.

9. The power tool as defined in claim 1, comprising a second rotation speed setting member that can be manually operated by a user, wherein the second rotation speed is selectively set by the second rotation speed setting member.

10. The power tool as defined in claim 1, wherein the power tool is configured to be capable of disabling the first driving mode.

11. The power tool as defined in claim 1, wherein the rotary shaft is disposed on the front end region side of the rotation transmitting mechanism in the axial direction, and the detecting mechanism is disposed further apart from the front end region than the rotation transmitting mechanism in the axial direction.

12. The power tool as defined in claim 1, wherein:
the operating member comprises a trigger, and
in the first mode, the controller changes the rotation speed based on the amount of movement of the trigger with the first rotation speed as a maximum rotation speed and drives the brushless motor.

13. The power tool as defined in claim 1, wherein:
the operating member comprises a trigger, and
in the second mode, the controller changes the rotation speed based on the amount of movement of the trigger with the second rotation speed as a maximum rotation speed and drives the brushless motor.

14. The power tool as defined in claim 1, wherein the first rotation speed is in a range from 0% through 100% of a rated rotation speed of the brushless motor when the rated rotation speed of the brushless motor is set to 100%.

15. The power tool as defined in claim 1, wherein:
the detecting mechanism includes a switch, and
the power tool further includes:
  a movable member that is configured to move together with the rotary shaft in the axial direction; and
  a lever that is disposed to be rotatable on a fulcrum and that is configured to be rotated along with a movement of the movable member and operate the switch.

16. The power tool as defined in claim 15, wherein the lever is configured to enlarge the movement of the movable member and transmit the enlarged movement to switch.

17. The power tool as defined in claim 16, wherein:
the fulcrum is positioned in one end region of the lever,
the movable member is configured to come into contact with the one end region of the lever and rotate the lever when the movable member is moved, and
the lever is configured such that the other end region of the lever comes into contact with the switch and operate the switch when the lever is rotated.

* * * * *